Feb. 27, 1962     A. M. PRENTISS     3,022,628
JET ENGINE AUTOMATIC THRUST CONTROL
Original Filed May 26, 1948     5 Sheets-Sheet 1

INVENTOR

Feb. 27, 1962 A. M. PRENTISS 3,022,628
JET ENGINE AUTOMATIC THRUST CONTROL
Original Filed May 26, 1948 5 Sheets-Sheet 2

INVENTOR

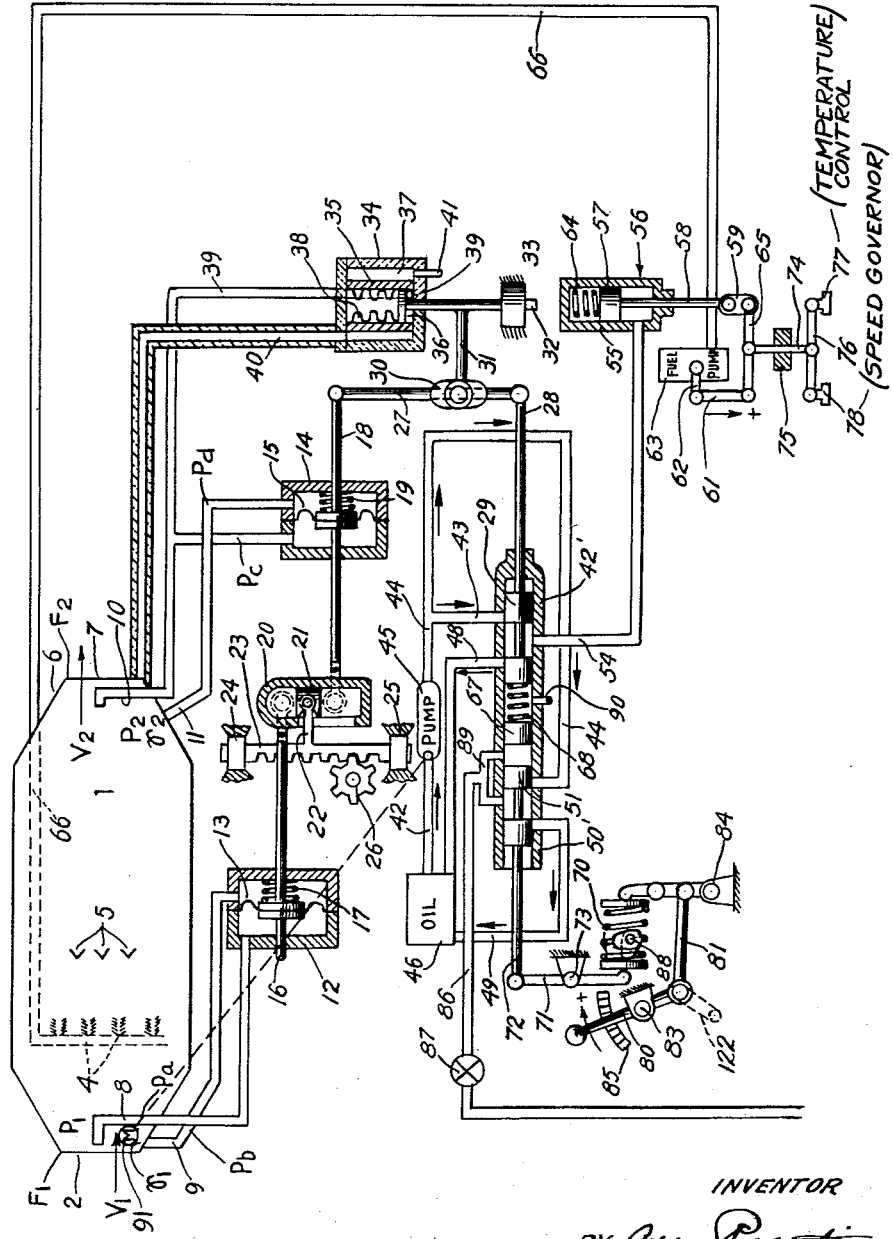

Feb. 27, 1962  A. M. PRENTISS  3,022,628
JET ENGINE AUTOMATIC THRUST CONTROL
Original Filed May 26, 1948  5 Sheets-Sheet 5
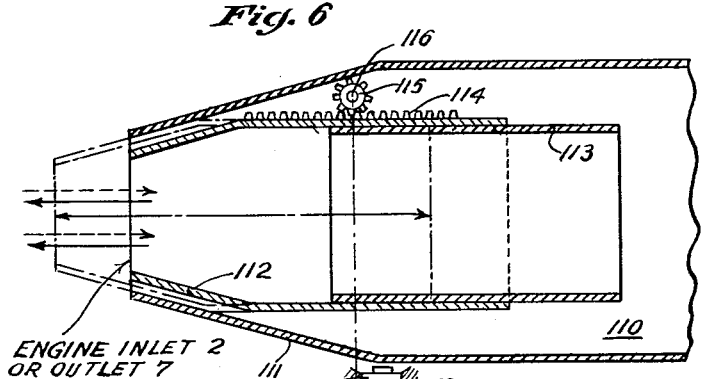
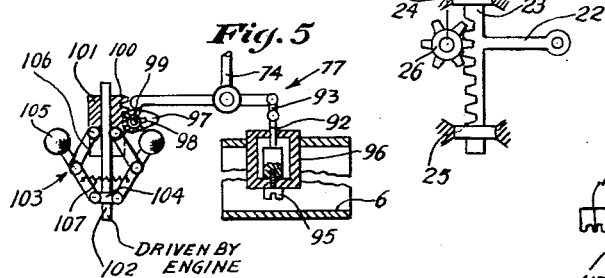
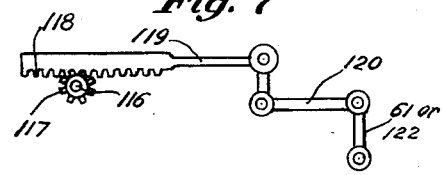
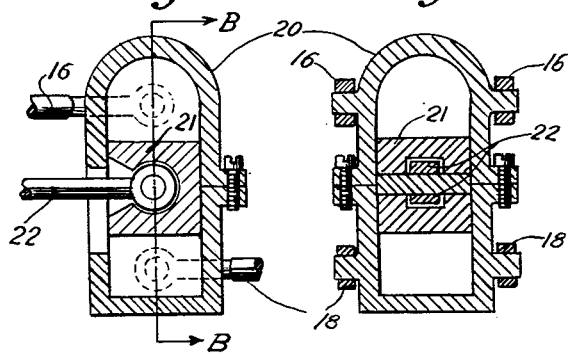
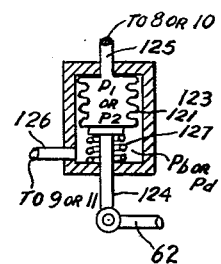
INVENTOR
BY *A. M. Prentiss*
ATTORNEY

United States Patent Office 3,022,628
Patented Feb. 27, 1962

3,022,628
JET ENGINE AUTOMATIC THRUST CONTROL
Augustin M. Prentiss, Hartford, Conn., assignor, by mesne assignments, to Chandler-Evans Corporation, West Hartford, Conn., a corporation of Delaware
Continuation of abandoned application Ser. No. 29,384, filed May 26, 1948. This application Aug. 24, 1954, Ser. No. 451,829
12 Claims. (Cl. 60—35.6)

This application is a continuation of application Ser. No. 29,384, filed May 26, 1948, now abandoned.

This invention pertains to automatic controls for jet engines and more particularly has reference to controls for regulating and equalizing the thrusts from the several jet engines of multi-engine aircraft. While this invention is primarily applicable to plain (ram) jet and turbojet engines without propellers, it also applies to turbojet engines with propeller (prop-jet), where a substantial part of the propelling power of the engine is exerted through the jet effect of its exhaust gases. Unless otherwise qualified, it will be understood that the term "jet engines," as used in this application, includes all of these types of engine.

In the operation of high speed aircraft, propelled by jet engines, it is essential not only that the thrust of each engine be at all times under the control of the pilot, but also in multi-engine aircraft the thrusts from the several engines be equalized and balanced, in order that no yaw moment be developed tending to make the airplane go off course.

In multiple, jet-engined aircraft, moving at speeds approaching or perhaps exceeding sonic velocity, small differences in thrust between different engines may cause a material yaw moment to prevail, and in case of a substantial loss of thrust by any engine, the yaw moment, if not rapidly corrected, may result in serious difficulties.

Heretofore, the performance of an aircraft turbojet engine with propeller (prop-jet) has generally been controlled by regulating the speed (r.p.m.) of the engine and/or the pitch of the propeller, so as to maintain a constant speed and/or thrust of the propeller for any given setting of the pilot's control lever, and in the turbojet engined aircraft, without propeller, the performance of the engine has been controlled by regulating the speed of the gas turbine which drives its air compressor, so as to maintain a constant speed of the engine with any given setting of the pilot's control lever. In multi-engine aircraft, with both turbo-jet and prop-jet engines, the aerodynamic balance of the airplane has been controlled by synchronizing the speed (r.p.m.) of the several engines, usually based on the speed of one of the engines selected as a master engine.

With prop-jet engines at the higher speeds, when a considerable part of the thrust developed by the engines is due to the jet effect, and with turbo-jet and ram-jet engines at all speeds, experience has shown that the aerodynamic balance of a multiple engine airplane cannot be satisfactorily controlled by synchronizing only the speeds of the several engines, because for the same engine speed (r.p.m.) the thrust of any engine may vary as much as 10% to 15%, depending upon the operating characteristics and condition of the particular engine. Accordingly, in order that a multi-engine airplane may fly a straight course, it is necessary to balance the thrusts of the several engines and to maintain this balance at all times, preferably without manual manipulation by the pilot.

Experience has also shown that turbojet and ram-jet engines may encounter difficulties from excessive engine speeds and/or temperatures, and it has been customary heretofore to provide each engine with a device responsive to engine speed (r.p.m.) and/or (tail pipe) temperature which will override the automatic control and limit the speed of the engine to a maximum safe r.p.m. whenever greater speeds and/or temperatures are developed in the engine. In regulating and equalizing the thrusts of the several jet engines of multi-engine aircraft, it is also desirable to provide means for preventing the overspeeding and/or overheating of any engine without disturbing the balance of the group.

In a multi-engine aircraft, it is also desirable that the pilot be able to normally control all the engines from a single manual control lever, but each engine should be capable of operation independently of all the others, so that in case trouble develops in any one engine, causing it to operate below par, the efficiency of the other engines will not be affected.

In a companion application of Milton E. Chandler, Serial No. 23,936, filed April 29, 1948, now Patent No. 2,853,851, and assigned to the same assignee as this application, there was disclosed a hydraulically operated control system for the jet engines of a multi-engine aircraft, wherein each engine was mounted so as to be movable with reference to the chassis of its airplane, and the jet thrusts of all the engines were automatically regulated and equalized by the movements of each engine, so that the thrusts of all the engines were balanced with each other, and any yaw moment tending to make the aircraft go off course was eliminated. In that control system, the operation of a plurality of jet engines was controlled by selecting one engine to function as a master, and this engine controlled the performance of the other engines of the group as slave engines.

Such a control system is open to three objections, which the invention herein disclosed is designed to overcome. First, movably mounting the engines requires specially designed bearings and structural modifications in the chassis of the airplane. Secondly, movably mounted engine require special compensating means for forces due to engine mass, i.e., weight and inertia effects of the engine. Thirdly, the use of one engine of a multi-engine aircraft to control the operation of the other engines necessarily limits the overall performance of the whole group to that of the master engine, and whenever the performance of that engine is below par or average performance of the group, there is an unavoidable loss of power and efficiency of all the other engines.

The invention herein disclosed is, therefore, in the nature of an improvement over that disclosed in the companion application cited above.

Accordingly, an object of this invention is to provide means for controlling the speed of flight of a jet-engined aircraft by regulating the performance of all the engines from a single manual control lever, which is adapted to secure from each engine a desired thrust, which produces a desired speed of light, corresponding to the position of said lever, and means for automatically equalizing the thrust of each engine with that of the others.

Another object is to provide means for automatically controlling the operation of plurality of jet engines of a multi-engine airplane, in response to a manual control element of one of the engines selected as a master control, so that the thrusts from all the engines is equalized and balanced.

Another object is to provide pneumatically actuated means for automatically regulating and equalizing the thrusts from a plurality of jet engines in a multi-engine airplane so that no yaw moment will be produced tending to make the airplane go off course.

Another object of this invention is to provide a control system for a group of jet engines in a multi-engine aircraft, where each engine is provided with an identical control, and all these controls are so inter-related that the performance of all the engines can be controlled from the single manual control lever, pertaining to any one of the engines, but each engine operates independently of all the others, so that below par performance of any engine does not affect the efficiency of the other engines.

Another object of this invention is to provide means for controlling the operation of a jet engine by means of the differential pressure produced by the velocities of its air supply and exhaust gases, so as to obtain a desired thrust in response to any given setting of the pilot's control lever, within the limits of safe temperature and/or speed of the engine.

Still another object is to provide a speed and/or temperature override control device for each engine of a multi-engine airplane, so that if the speed and/or temperature of any engine should exceed a predetermined safe limit, the override device temporarily takes control of that engine and reduces its speed and/or temperature to safe operating limits, as determined by the setting of the override control device.

With these and other objects in view which may be incident to my improvements, my invention consists in the combination and arrangement of elements hereinafter described and illustrated in the accompanying drawings in which:

FIGURE 4 is a schematic view, on a larger scale, of engine No. 1 of FIGURE 2.

FIGURE 5 is a schematic view on a larger scale, of the maximum temperature and speed controls of FIGURES 1 and 2.

FIGURE 6 is a fragmentary longitudinal section of either the air intake duct or tailpipe of the engines of FIGURES 1 and 2, showing means for varying the cross-sectional areas of these elements.

FIGURE 7 is a schematic view of the mechanism for operating the means shown in FIGURE 6, either manually from the pilot's control lever or automatically by the regulating systems shown in FIGURES 1 and 2.

FIGURE 8 is a schematic view, partly in section, of the device for regulating the fuel/air mixture in the engine, by either the flow of air to the engine, or the discharge of exhaust gases therefrom, when the regulating system shown in FIGURES 1 and 2 is used for controlling the operation of the engine by varying the area of the air intake, or the area of the exhaust gas nozzle, of the engine.

FIGURES 9A and 9B are vertical cross-sectional views, on an enlarged scale, of one of the elements of the regulating systems shown in FIGURES 1 and 2, the section in FIGURE 9B being along the line B—B of FIGURE 9A.

Figure 1:
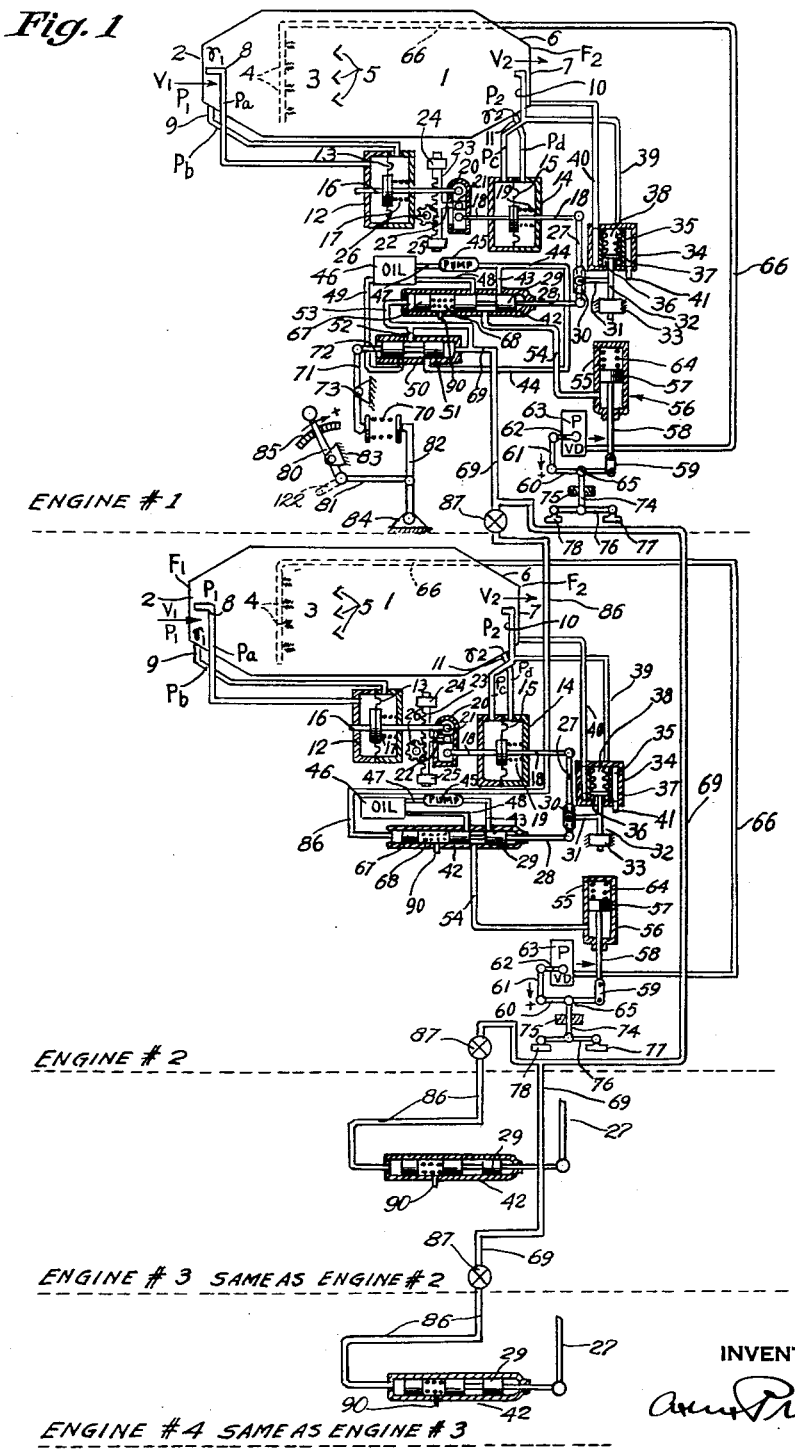
FIGURE 1 shows, schematically, one embodiment of my improved control system as applied to an airplane propelled by a plurality of jet engines, wherein only one manual control device is provided for controlling all the engines of a multi-engined aircraft.

Since the fluid thrust of a jet engine is a function of the mass airflow through the engine and since a Pitot tube measures the velocity head of a fluid current, the control of the thrust from a jet engine can be based upon the velocity heads, as measured by a Pitot tube, at the air inlet and at the exhaust gas outlet of the engine. The general relationship of the several factors involved is as follows.

Let:

$V$=Volume of air (in cu. ft.) passing through engine in $t$ seconds.

$W$=Weight of air (in lbs.) passing through engine in $t$ seconds.
$v_1$=Entering velocity (ft. per sec.) of air=velocity of plane.
$v_2$=Leaving velocity (ft. per sec.) of gases=discharge velocity of jet, relative to plane.
$p_1$=Total pressure (lbs. per sq. ft.) of entering air.
$p_2$=Total pressure (lbs. per sq. ft.) of discharge gases.
$\gamma_1$=Weight (lbs. per cu. ft.) of entering air.
$\gamma_2$=Weight (lbs. per cu. ft.) of discharge gases.
$T_1$=Temperature (abs. ° C.) of entering air.
$T_2$=Temperature (abs. ° C.) of discharge gases.
$F_1$=Cross-sectional area (sq. ft.) of air intake duct.
$F_2$=Cross-sectional area (sq. ft.) of tail pipe.
$h_1$=Head (in feet) of entering air.
$h_2$=Head (in feet) of discharge gases.
$\zeta$=Coef. of efflux of discharge gases.
$P$=Total thrust, in pounds, of the discharge jet.
$g$=Acceleration due to gravity (32.2 lbs. per sec.$^2$).

The mass of air passing through the engine has its velocity increased from $v_1$ to $v_2$.

To accelerate W pounds of air from $v_1$ to $v_2$ in $t$ seconds requires a force $$P=\frac{W}{g}\times (\text{acceleration of air})$$

$$=\frac{W}{g}\times\frac{(v_2-v_1)}{t}=\frac{M}{t}(v_2-v_1)$$

$$=\frac{V\gamma_2}{g}\times (v_2-v_1)$$

But $$\frac{V}{t}=F_2(v_2-v_1)$$

since $(v_2-v_1)$ is the absolute velocity of air passing out of engine.

Therefore $$P=\frac{\zeta F_2\gamma_2}{g}(v_2-v_1)(v_2-v_1)$$

$$=\frac{\zeta F_2\gamma_2}{g}(v_2-v_1)^2 \quad (1)$$

$$=2F_2\gamma_2\left\{\frac{\zeta V_2^2}{2g}+\frac{\zeta V_1^2}{2g}-\frac{2\zeta(V_2\times V_1)}{2g}\right\} \quad (2)$$

A Pitot tube at the air inlet and gas outlet give indications $$h_1=k\frac{v_1^2}{2g} \text{ and } h_2=k\frac{v_2^2}{2g}$$

Where $k$=Coef. of flow which varies from 2.00 to 1.00, depending upon shape of entrance of tube. The coefficient $\zeta$ also varies from 2.00 to 1.00, depending upon shape of engine. By properly shaping entrance to Pitot tubes, $k$ may be made $=\zeta$.

Therefore, Pitot tube readings indicate:

$$h_1=\frac{v_1^2}{2g} \text{ and } h_2=\frac{v_2^2}{2g}$$

Substituting these values in Equation 2 we have $$P=2F_2\gamma_2\left(h_2+h_1-\frac{2\zeta(v_2v_1)}{2g}\right) \quad (3)$$

But $$V_2=\left(\frac{F_1}{F_2}\right)v_1, \text{ so that } \frac{2\zeta(v_2v_1)}{2g}$$

$$=\frac{2\zeta(F_1)}{(F_2)}\frac{v_1^2}{2g}=\frac{2\zeta(F_1)}{(F_2)}h_1$$

Therefore, $$P=2F_2\gamma_2\left(h_2+h_1-\frac{2\zeta(F_1)}{(F_2)}h_1\right) \quad (4)$$

$$P=2F_2\gamma_2[h_2+h_1\{1-2\cdot\zeta(F_1/F_2)\}] \quad (5)$$

$$\gamma_2=\gamma_a\left(\frac{T_a}{T_2}\right)\times\left(\frac{P_2}{P_a}\right)$$

where $\gamma_a$, $T_a$ and $p_a$ are the density, temperature and pressure of the atmospheric air outside engine, and $$h_1 = p_1/\gamma_1 \text{ and } h_2 = p_2/\gamma_2$$

Thrust is, therefore, a function of air intake and tail pipe areas, air intake and tail pipe Pitot readings, the coefficient of flow, and the density of the discharge gases, which last factor is equal to the density of atmospheric air, modified by the ratio of atmospheric temperature and pressure to temperature and pressure of the discharge gases.

When $\zeta$ is equal to 1.00, then from Equation 5:

$$P = 2F_1\gamma_2[h_2 - h_1] \text{ when } F_2 = F_1 \quad (6a)$$

$$= F_1\gamma_2[h_2 - 3h_1] \text{ when } F_2 = \tfrac{1}{2}F_1 \quad (6b)$$

$$= \tfrac{2}{3}F_1\gamma_2[h_2 - 5h_1] \text{ when } F_2 = \tfrac{1}{3}F_1 \quad (6c)$$

$$= \tfrac{1}{2}F_1\gamma_2[h_2 - 7h_1] \text{ when } F_2 = \tfrac{1}{4}F_1 \quad (6d)$$

Where $\zeta$ is greater than 1.00, it has a substantially constant value by which the ratio $F_1/F_2$ must be multiplied, and this somewhat increases the coefficient of $h_1$ in Equation 6.

Referring to FIGURE 1 of the drawings the reference numeral 1 denotes the body of a ram-jet engine having the usual air inlet 2, combustion chamber 3 with burner nozzles 4 and flame holders 5 therein, followed by a tail pipe 6 ending in an exhaust gas outlet 7. If the engine is a turbojet, the combustion chamber 3 with burner nozzles 4 is located further toward the tail pipe 6 and is preceded by an air compressor and followed by a gas turbine. In either type of engine, the power output may be controlled by either varying the fuel supply to the burner nozzles 4, or by varying the air supply through air inlet 2 to the combustion chamber 3, or by varying the discharge of exhaust gases through the outlet 7. Since the improved engine control system herein disclosed is equally applicable to either a ram or turbojet engine, (with or without propeller), the detail construction and arrangement of the engine forms no part of my invention.

A Pitot tube 8 facing upstream, is placed near the center of the air inlet 2 and a small air conduit 9 parallels Pitot tube 8, but has its open end at right angles to the opening of the Pitot tube and the direction of air flow. Another Pitot tube 10 and air conduit 11 are similarly located near the center of the exhaust gas outlet 7. Pitot tube 8 and conduit 9 lead into a chamber 12 on opposite sides of a diaphragm 13, which divides chamber 12 into two air-tight compartments. Pitot tube 10 and conduit 11 are similarly arranged with reference to a chamber 14 and diaphragm 15. Slidably mounted in chamber 12 is a rod 16, which is attached to diaphragm 13 and biased toward the left by a spring 17. A rod 18 and spring 19 are similarly mounted in chamber 14. The adjacent ends of rods 16 and 18 are bifurcated and pivotally atached to opposite sides of a slotted cylindrical link 20. Slidably mounted in the cylinder of link 20 is a pivot block 21 which is pivotally connected to an arm 22 carried by a rack 23 which is reciprocally mounted in fixed sleeves 24 and 25. A pinion 26 engages rack 23 and is adapted to be rotated by a device which varies the cross-sectional area of either the air inlet 2 or the exhaust gas outlet 7, as hereinafter disclosed, so that the position of the pivot block 21, about which link 20 rocks, is shifted in proportion to the degree of opening of either the air inlet 2 or the exhaust gas outlet 7. The device which varies the cross-sectional area of the exhaust gas outlet may be manually operated by connecting it to the pilot's control lever, or it may be automatically operated by the control system as hereinafter disclosed (see FIGURE 7).

From the arrangement just described, it is clear that diaphragm 13 in chamber 12 is subject to the difference between the velocity and static heads at the air inlet 2, and diaphragm 15 in chamber 14 is similarly subject to the difference between the velocity and static heads of the exhaust gases at the outlet 7. The air current entering air inlet 2 gives rise to a pressure $p_a$ in Pitot tube 8, while the static head at the same point maintains a lower pressure $p_b$ in conduit 9, and the difference between these pressures $(p_a - p_b)$ is a measure of the velocity head $h_1$ at air inlet 2. Similarly, the exhaust gas current issuing from outlet 7 gives rise to a pressure $p_c$ in Pitot tube 10 while the static head at the same point maintains a lower pressure $p_d$ in conduit 11, and the difference between these pressures $(p_c - p_d)$ is a measure of the velocity head $h_2$ at outlet 7. Since the pressures $p_a$ and $p_c$ always exceed the pressures $p_b$ and $p_d$ respectively, diaphragms 13 and 15 exert a net thrust on rods 16 and 18 to the right in opposition to springs 17 and 19. These springs are made very light and are both of the same strength. Their purpose is merely to steady the movements of the diaphragms 13 and 14 under variations in pressure. Since these springs act in opposite directions on link 20, they balance each other and their net effect on link 20 is negligible. Diaphragms 13 and 15 are of the same size and therefore exert thrusts on rods 16 and 18 respectively proportional to the velocity heads $h_1$ and $h_2$.

When pivot 21 is in a position midway between the pivots of rods 16 and 18, as shown in FIGURE 1 these rods act with equal leverage on link 20 and hence the net thrust on rod 18 is proportional to $h_2 - h_1$. This is the condition coinciding with Equation 6a and represents the situation when the cross-sectional area $F_2$ of the exhaust gas outlet 7 is equal to the area $F_1$ of the air inlet 2. As the area $F_2$ is progressively reduced, by the device mentioned above, while the area $F_1$ remains the same, the device which reduces the area $F_2$ also simultaneously moves the pivot 21 a proportional distance downward, so as to progressively increase the leverage of link 20 on rod 16, as compared to that of rod 18. Thus, when pivot 21 is moved down one-half of the distance between its mid-position (as shown in FIGURE 1) and the pivot of rod 18, the leverage of rod 16 on link 20 is three times that of rod 18, and therefore coincides with Equation 6b when outlet area $F_2$ is equal to one-half of inlet area $F_1$. Similarly, when pivot 21 is moved down two-thirds of the distance between its mid-position and the pivot of rod 18, the leverage of rod 16 on link 20 is five times that of rod 18, and therefore coincides with Equation 6c, when outlet area $F_2$ is one-third of $F_1$. Finally, when pivot 21 is moved down three-fourths of the distance between its mid-position and the pivot of rod 18, the leverage of rod 16 on link 21 is seven times that of rod 18, and coincides with Equation 6d, when outlet area $F_2$ is one-fourth of $F_1$, which is its minimum opening.

From what has been shown above, it follows that the net thrust to the right on rod 18 is generally proportional to the jet thrust of the exhaust gases of the engine, for varying velocities of air flow through the engine, and for varying openings $F_2$ of the exhaust gas outlet from its full open area $(=F_1)$ to one-fourth that area. Also from an inspection of Equation 5, if the net thrust on rod 18 is compensated for variations in the density $\gamma_2$ of the exhaust gases issuing from outlet 7, this compensated thrust is linearly proportional to the jet thrust of the engine and may therefore be used to control the operation of the engine in accordance with its jet thrust. This compensation is effected by the following device. Rod 18 is pivotally connected through a link 27 to the stem 28 of a servo valve 29. Slidably mounted on link 27 is a sleeve 30 which is pivoted to an arm 31 integral with a rod 32 which is reciprocally mounted in the fixed sleeve 33 and the bottom wall of a cyliner 34 which is composed of thermal insulating material.

A thin metal partition wall 35 divides cylinder 34 into an inner cylindrical chamber 36 and an outer annular space 37. A sealed bellows 38 is fixed to the top wall of chamber 36 and has its movable end attached to rod 32. Bellows 38 contains a temperature and pressure responsive fluid which is sealed therein at standard atmospheric temperature, $T_s$ (15° C.) and pressure, $p_s$ (14.7 lbs. per sq. inch), at which the fluid has a density $\gamma_s$. Chamber 36 is connected by a conduit 39 to Pitot tube 10 so that it contains exhaust gases at a pressure $p_2$. Annular space 37 is connected at its upper end by a conduit 40 composed of thermal insulating material with the exhaust gas outlet 7, and has at its lower end on the opposite side a vent 41 to the atmosphere. As the pressure $p_2$ in conduit 40 is always higher than the atmospheric pressure outside the engine, a continuous current of exhaust gases, at their temperature, $T_2$, flows through annular space 37 and thereby maintains a temperature $T_2$ therein. Partition 35 is composed of a thin metal of high thermal conductivity and cylinder 34 is made of thermal insulating material so that the current of exhaust gases flowing through space 37 maintains the temperature $T_2$ in chamber 36, while the engine is in operation. Accordingly, the fluid in bellows 38 is subjected to a pressure $p_2$ and temperature $T_2$ at all times that the engine is operating. The density $\gamma_2$ of the exhaust gases in chamber 36 is related to the density $\gamma_s$ in the bellows 38 according to the formula:

$$\gamma_2/\gamma_s = \frac{T_s p_2}{T_2 p_s}$$

so that $$\gamma_2 = \left(\frac{\gamma_s T_s}{p_s}\right) \times \frac{p_2}{T_2}$$

And since $(\gamma_s T_s/p_s)$ is a constant (C) for the fluid in bellows 38, it follows that $\gamma_2 = Cp_2/T_2$. As the temperature of the exhaust gases $T_2$ increases the fluid in bellows 38 will expand and move the lower end of the bellows and rod 32 downward proportionally to the rise in temperature $T_2$, and vice versa. At the same time, an increase in the pressure of the exhaust gases $p_2$ will contract the bellows 38 and move the lower end of the bellows and rod 32 upward in proportion to the rise in pressure $p_2$, and vice versa. From the foregoing, it follows that the movement of rod 32 will be in linear proportion to variations in the density $\gamma_2$ of the exhaust gases.

As the arm 31 on rod 32 raises or lowers the position of Pitot sleeve 30, it proportionally varies the thrust on stem 28 of servo valve 29 caused by the net thrust of rod 18 on the other end of link 27. The thrust on stem 28 is therefore proportional to the net thrust on rod 18, modified by variations in the density $\gamma_2$ of the exhaust gases, and since the net thrust on rod 18 is proportional to the jet thrust of the exhaust gases, the force exerted on servo valve 29 by rod 28 is in linear proportion to the jet thrust of the engine and may therefore be used to control the operation of the engine in accordance with its jet thrust.

Servo valve 29 is of the conventioned spool type, having two cylindrical end portions connected by a center portion of reduced diameter, and is slidably mounted in a cylinder 42 which is connected by conduits 43 and 44 to an oil pump 45 driven by an air current motor 91, or by the engine 1 (if of the turbojet type). An oil tank 46 is connected by a conduit 47 to pump 45 and by a drain pipe 48 to cylinder 42. Another drain pipe 49 connects tank 46 to the cylinder 50 of a second servo valve 51 which is also connected to pump 45 by conduit 44, and to cylinder 42 by conduits 52 and 53. A conduit 54 connects cylinder 42 with the cylinder 55 of an hydraulic motor 56, of which the piston 57 is connected by means of a rod 58, link 59, lever 60, and link 61 to the regulating arm 62 of a variable delivery fuel pump 63. A spring 64 in cylinder 55 biases piston 57 downwardly in opposition to the fluid pressure in the lower end of cylinder 55. Lever 60 is mounted on a pivot 65, so that when an increase in fluid pressure in cylinder 55 pushes piston 57 up, arm 62 on pump 63 is moved down in a counter-clockwise direction which increases the fuel delivery of the pump through a conduit 66 to burner nozzles 4 in combustion chamber 3, and vice versa.

Pivot 65 of lever 60 is movable by the reciprocation of rod 74 in fixed sleeve 75, in response to the temperature and speed of engine 1, rod 74 being pivotally connected through a floating lever 76 to a maximum temperature override control device 78.

As shown in FIGURE 5, temperature control device 77 comprises a cylinder 91 having a stem 92 connected at its upper end by a link 93 with the right end of floating lever 76, and attached at its lower end by a screw 95 to one end of a larger cylinder 96, mounted in the wall of tail pipe 6 of the engine so as to project into the stream of exhaust gases flowing through said tail pipe. Cylinders 91 and 96 are made of different metals, having widely different coefficients of thermal expansion, so that when heated by the exhaust gases in tail pipe 6, cylinder 91 expands at a much greater rate than cylinder 96. Hence, as the temperature of the exhaust gases rises in tail pipe 6, cylinder 91, expanding at a greater rate than cylinder 96, raises stem 92, link 93 and the right end of lever 76, thus reducing the fuel flow from pump 63 to the engine, until the decreasing speed of the engine restores the temperature in tail pipe 6 to the selected maximum safe value.

Speed control device 78 comprises a cam 97, fixed to shaft 98 on which is also fixed a gear pinion 99 that meshes with a toothed rack 100, carried by a sleeve 101, which is slidably mounted on a shaft 102 of fly-ball speed governor 103. Shaft 102 is driven by the engine and carries a fixed collar 104 to which are pivotally attached weighted arms 105 connected by links 106 to sleeve 101. A tension spring 107 connected to arms 105 opposes the centrifugal force tending to open arms 105 upon rotation by shaft 102. As the speed of rotation of the engine increases, arms 105 open and lower sleeve 101 which rotates pinion 99 and cam 97 in a counter-clockwise direction. This raises the left end of floating lever 76 which bears against cam 99, and reduces the fuel flow from pump 63 to the engine until the decreasing speed of the engine reaches its selected maximum safe value.

By virtue of this arrangement, whenever the temperature in tail pipe 6 of engine 1 exceeds a selected maximum safe temperature, override control device 77 raises the right end of lever 76, and thereby the pivot 65 of lever 60, which reduces the rate of delvery of fuel by pump 63 to the engine. This causes the engine to reduce its speed and lowers the temperature in tail pipe 6, until said temperature is within the maximum safe limit. Similarly, whenever the speed of engine 1 exceeds a selected maximum safe r.p.m., override control device 78 raises the left end of lever 76, and thereby the pivot 65 of lever 60, which reduces the rate of fuel delivery of pump 63 to the engine. This causes the engine to reduce its speed until its r.p.m. is within the maximum safe limit.

Mounted in cylinder 42 to the left of servo valve 29 is a piston 67 which is biased to the left by an interposed spring 68. The left end of cylinder 42 is connected through conduits 53 and 69 to the right end of cylinder 50. Accordingly, any movement of servo valve 29 to the left transmits a thrust in the same direction through spring 68 to piston 67 which is resisted by the pressure of the oil in the left end of cylinder 42. This presure is transmitted through conduits 53, 52 and 69 to the space between the ends of servo valve 51 and to the right end of cylinder 50. The thrust thus exerted on servo valve 51 tends to move it to the left in opposition to a force exerted by a spring 70 through a lever 71 which is mounted on a fixed pivot 73 and connected to a rod 72 attached to the left end of servo valve 51. The force of spring 70 is varied by a manual control lever 80 through a link 81 and lever 82. Levers 80 and 82 are mounted on fixed pivots 83 and 84 respectively, and lever 80 engages with a quadrant 85 which is graduated to indicate the jet thrust developed by the engine and holds the control lever 80 in a fixed position as set by the pilot.

Conduit 69 from engine No. 1 connects through branch conduits 86 with servo valve cylinders 42 of engines Nos. 2, 3 and 4. Each branch 86 corresponds to conduit 53 of engine No. 1 and each has a cut-off valve 87 which permits any of the engines to be cut out of the common control system, without affecting the operation of the other engines of the group, in case of trouble developing in any particular engine.

Servo valve 51 and its asociated mechanism are common to the whole group of engines and constitute the only master control for the group. In FIGURE 1 this master control is shown as located and associated with engine No. 1, but it does not pertain to engine No. 1, any more than to all the other engines. In fact, it is preferably located centrally in the airplane, close to the pilot's control lever. When the master control is located in a position removed from all the engines, the control system for each engine is as shown in FIGURE 1 for engine No. 2.

Figure 2:
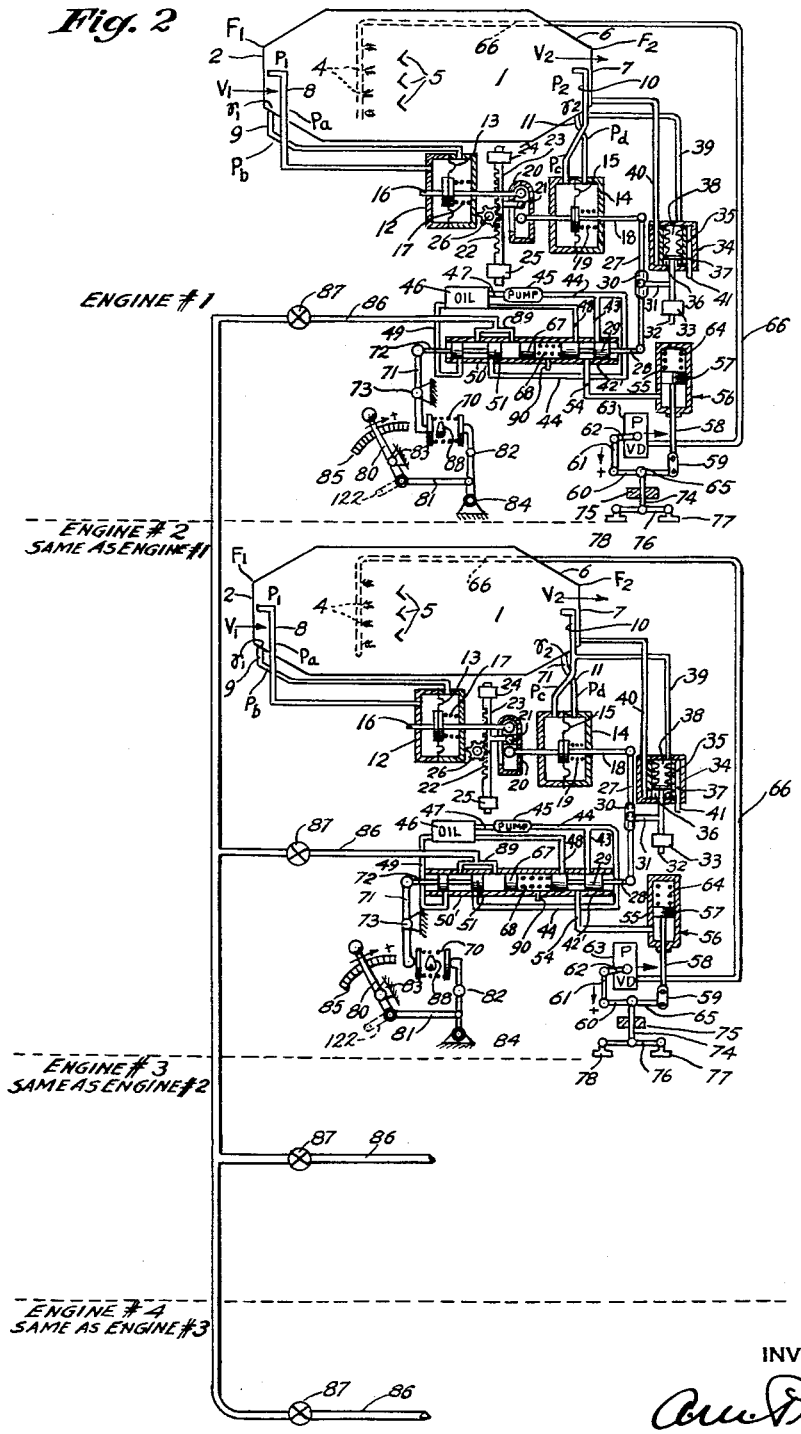
FIGURE 2 shows, schematically, an alternate arrangement of my improved control system, wherein an identical manual control device is provided for each engine, but only one, as selected by the pilot, is used at any one time to control the operation of all engines of a multi-engined aircraft, and all the other manual controls are locked in an inoperative position.
Figure 3:
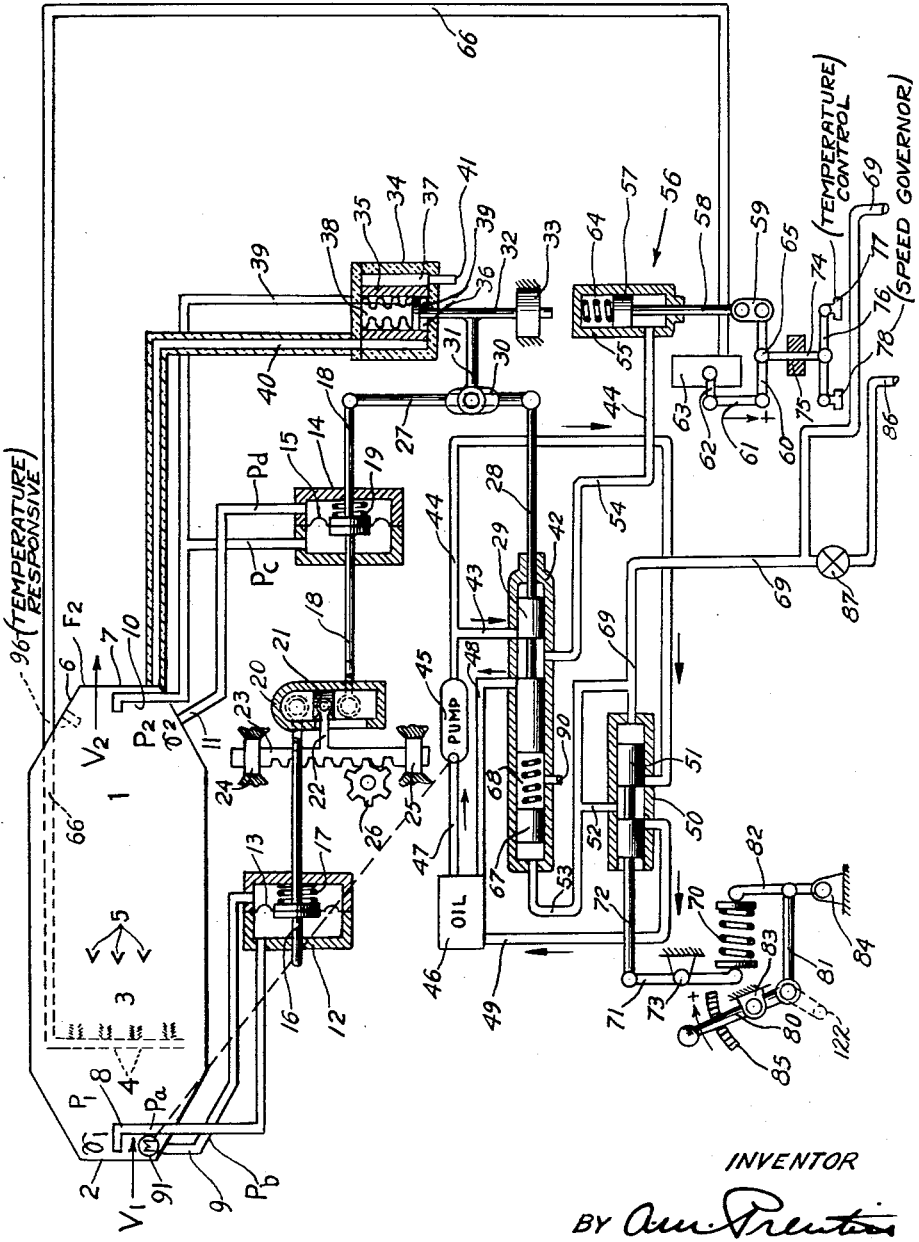
FIGURE 3 is a schematic view, on a larger scale, of engine No. 1 of FIGURE 1.

The alternate arrangement of my control system shown in FIGURE 2 is essentially the same as that shown in FIGURE 1 (with the same reference numerals denoting like parts) except as follows:

(1) An independent manual control is provided for each engine and any one of these controls may be used as a single manual control for the whole group.

(2) The manual controls not selected to control the group are rendered inoperative by locking the lower end of each lever 71 by means of a cam latch 88 which is rotated manually 90° in a counter-clockwise direction (see FIG. 4).

(3) Servo valves 29 and 51 (of FIGURE 1) are mounted in a common cylinder 42'—50', with piston 67 interposed between them, and a bridge conduit 89 replacing conduits 52 and 53 of FIGURE 1. Also, conduit 69 is eliminated and branch conduits 86 are connected directly to conduit 89.

The vent 90 to atmosphere prevents compression of the air in space between servo valve 29 and piston 67 (in FIGURES 1 and 2).

A simple mechanism for varying the area $F_1$ of air inlet 2 (when applied thereto), or for varying the area $F_2$ of exhaust gas outlet 7 (when applied thereto), is illustrated in FIGURES 6 and 7, wherein the reference numeral 110 denotes either the air inlet duct 2 or the tailpipe 6 through which the air enters the engine or the exhaust gases escape therefrom. The full line arrows in FIGURE 6 indicate the direction of the entering air when element 110 is an air inlet; and the dotted line arrows indicate the direction of flow of the exhaust gases, when 110 is the tailpipe. Member 110 has an inwardly tapered portion 111 at its open end in which is concentrically located a similarly tapered choke pipe 112, slidably mounted on a fixed cylindrical sleeve 113, which is located concentrically in the inner cylindrical portion of member 110. The cylindrical portion of choke pipe 112 telescopes over sleeve 113 with a free-running but substantially closed fit thereon, and is provided on its outer surface with a toothed rack 114 which engages a pinion 115 fixedly mounted on a shaft 116 which extends through the wall of member 110. Outside member 110, shaft 116 has also fixed thereon a second pinion 117 (FIGURE 7) which engages a toothed rack 118, integral with a rod 119 which may be connected by a bell crank lever 120 to link 61 (FIGURE 1), in lieu of arm 62, which is disconnected, so that the pump 63 is no longer controlled by the control apparatus shown in FIGURES 1 or 2. In this case, shafts 116 and 26 are interconnected as just indicated, and pump 63 is controlled by a bellows 121 which may be connected to either the air inlet 2, or exhaust gas outlet 7, as desired (see FIGURE 8).

Alternatively, rack 118 may be connected by a link 122 to the lower end of manual control lever 80 (FIGURE 1) when it is desired to have the area $F_1$ of air inlet 2, or area $F_2$ of exhaust gas outlet 7, manually adjusted by the pilot. In this case, shaft 116 (FIGURE 6) is connected to the shaft of pinion 26 (FIGURE 1) by suitable meshing gears (not shown), so that rotation of the former will cause corresponding rotation of the latter in a desired ratio.

In either case, when bell crank lever 120 is rotated counterclockwise, it pushes rod 119 and rack 118 to the left. This rotates pinions 117 and 115 in a counterclockwise direction which moves choke pipe 112 to the right. As choke pipe 112 moves to the right, it is withdrawn within member 110, increasing the area $F_1$ (or $F_2$), as shown in full lines in FIGURE 6, until the open ends of both 110 and 112 are in the same plane, at which point the cross-sectional discharge area ($F_1$ or $F_2$) of member 110 is a maximum. Conversely, when bell crank lever 120 moves rack 118 to the right, choke pipe 112 is moved to the left which progressively reduces the cross-sectional area of the passageway between its outer wall and the inner wall of conduit portion 101, until choke pipe 112 contacts tapered portion 111, as shown in dotted lines in FIGURE 6, whereupon the total cross-sectional area ($F_1$ or $F_2$) of member 110 is reduced to the cross-sectional area of the end of choke pipe 112.

Since the propelling thrust of a jet motor is a function of the cross-sectional area of the jet of exhaust gases, the thrust of the engine may be varied and controlled by regulating the cross-sectional area ($F_2$) of the tailpipe through which the exhaust gases are discharged, as indicated above. Also, since the thrust of a jet engine is a function of the mass air flow through the engine, the thrust of the engine may be varied and controlled by regulating the cross-sectional area ($F_1$) of the air intake duct of the engine. This may be accomplished in the same manner as just described for regulating the cross-sectional area ($F_2$) of the tailpipe, by applying the same control mechanism to the air intake duct instead of the tailpipe. Irrespective of which application of this control mechanism is used, the fuel supply to the engine is regulated by bellows 121 on the mass air or gas flow through the engine, so as to maintain a proper mixture under all operating conditions.

As shown in FIGURE 8, bellows 121 is housed in an air-tight chamber 123, with its upper end fixed to the top wall of said chamber, and its lower, movable end attached by a rod 124 to the regulating arm 62 of fuel pump 63. The interior of bellows 121 may be connected by a conduit 125 to Pitot tube 8, and the interior of chamber 123 (outside of bellows 121) may be connected by a conduit 126 to conduit 9 (FIGURE 1); so that the pressure inside bellows 121 is the same as the total pressure ($P_1$) at air inlet 2, and the pressure inside chamber 123 is the same as the static pressure ($P_b$) at air inlet 2. The downward force exerted by bellows 121 on arm 62 is thus proportional to the difference between the total and static pressures at air inlet 2 which, as shown hereinabove, is a measure of the air flow through the engine 1. This downward force of bellows 121 is opposed by a constant rate spring 127 which acts to move arm 62 upwardly, upon a decrease in the pressure differential acting on bellows 121. With the foregoing arrangement, it is clear that when the flow of air through the engine increased, the pressure differential acting on bellows 121 increases proportionally, and by moving arm 62 downwardly (in a counter-clockwise direction), the fuel flow is correspondingly increased, and vice versa, so that the mixture ratio is maintained at the desired value.

Alternatively, the fuel flow may be similarly regulated by the flow of exhaust gases from outlet 7, by connecting conduit 125 to Pitot tube 10 (FIGURE 1), and connecting conduit 126 to conduit 11; so that the pressure inside bellows 121 is the same as the total pressure ($P_2$)

of the exhaust gases at outlet 7, and the pressure inside chamber 123 is the same as the static pressure ($P_d$) at outlet 7.

*Operation of control system*

The operation of the control system is based upon the following principles:

(1) The jet thrust developed by a jet engine is proportional to the mass air flow through the engine which is a function of the difference between the velocity heads at the air inlet and exhaust gas outlet of the engine, the cross-sectional area of the air intake and exhaust gas outlet, and the density of the exhaust gases discharged through the exhaust gas outlet.

(2) Pilot tube pressure, minus static pressure, at the air inlet and exhaust gas outlet is a measure of the velocity heads at those points.

(3) The difference between the velocity heads at the air inlet and exhaust gas outlet, modified by the ratio between the areas of the inlet and outlet, and compensated for the variation in the density of the exhaust gases with variations in their temperature and pressure and the altitude of flight (atmospheric density), is a measure of the jet thrust of the engine.

(4) A force proportional (3) is applied to one end of a servo valve 29 which is subjected at its other end to a force determined by the positioning of a manual control lever.

(5) Any inequality between the two forces acting on the servo valve actuates the valve and its movement varies the rate of output of the fuel pump 63 supplying to the engine.

(6) The balancing of forces on the servo valve keeps the engine operating with a jet thrust as called for by the setting of the pilot's control lever.

(7) The servo valves in the control mechanisms of all the engines of the group propelling a multi-engines aircraft are intreconncted by an hydraulic pressure line which equalizes the pressures on all the servo valves, and thus keeps all the engines operating with an equal jet thrust.

(8) The performance of each engine is controlled from a single manual control for the whole group, but each engine operates independently of all the others insofar as any correction required to bring its thrust in balance with the thrusts of the other engines is applied to that engine only. The single manual control may be common to all the engines and not pertain to any one of them (as in FIGURE 1) or the manual control of one of the engines may be selected as the single control for the group (as in FIGURE 2).

(9) The control mechanism of each engine includes an automatic override maximum temperature and/or speed control which prevents overheating and/or overspeeding of that engine, without affecting the operation of the other engines.

More specifically, the operation of my control system is as follows:

Each engine is provided with Pitot tubes 8 and 10 for respectively measuring the total pneumatic pressures $p_1$ of the air entering air inlet 2 and $p_2$ of the exhaust gases discharged through outlet 7. Means (conduits 9 and 11) are provided for taking off the static pressures of the air $p_b$ at inlet 2 and of exhaust gases $p_d$ at outlet 7. Pressures $p_a$ and $p_b$ act on opposite sides of diaphragm 13 in chamber 12, producing a thrust on rod 16 of $p_a - p_b = h_1$, while pressures $p_c$ and $p_d$ act similarly on diaphragm 15 in chamber 14, producing a thrust on rod 18 of $p_c - p_d = h_2$. Rods 16 and 18, connected to link 20 on opposite sides of its pivot 21, tend to rotate the link in opposite directions, therefore the thrust of rod 16 is subtractive from the thrust on rod 18, and in a ratio which varies with the position of pivot 21 from its mid-position, as shown in FIGURES 1 and 2, to its lowest position near the point of attachment of rod 18 to link 20. Pivot 21 is shifted by rack 23 and pinion 26 and the latter is connected to the mechanism which varies the cross-sectional area $F_2$ of outlet 7 as described hereinabove. As the areas of diaphragms 13 and 15 are equal and proportional to the cross-sectional area $F_1$ of air inlet 2, the net thrust (to the right) on rod 18 is proportional to $F_1 (h_2 - h_1)$.

Compensating device 30—40, modifies the thrust transmitted from rod 18 to rod 28 through link 27, by shifting pivot sleeve 30 of link 27 in proportion to variations in the density $\gamma_2$ of the exhaust gases discharged through outlet 7, so that the thrust on rod 28 is proportional to $2F_1 \gamma_2 (h_2 - h_1)$ which is proportional to the jet thrust of the engine, as shown by Equation 6 above.

The thrust of rod 28 on servo valve 29 is opposed by the force of piston 67, transmitted through spring 68. Piston 67 is forced to the right by the oil pressure in the left end of cylinder 42 which is determined by the position of servo valve 51. The position of servo valve 51 depends upon the oil pressure in the right end of cylinder 50 opposed by the thrust (to the right) of rod 72. The thrust on rod 72 is determined by the compression in spring 70 which in turn is controlled by the setting of manual control lever 80. Since cylinders 42 and 50 are connected by conduits 52 and 53, the oil pressure in cylinder 50 is equal to that in the left end of cylinder 42.

If the thrust on rod 72, as determined by the setting of manual control lever 80, is made greater than that of the oil pressure in cylinder 50, servo valve 51 will move to the right from its neutral position, as shown in FIGURES 1 and 2, and oil under higher pressure from pump 45 will be admitted to cylinder 50 (and also to the left end of cylinder 42) and servo valve 51 will move to the left until the oil pressure in cylinder 50 again equals the thrust on rod 72, when servo valve 51 will remain in its neutral position, until the balance between the thrusts on rod 72 and the oil pressure in cylinder 50 is again disturbed, either by a new thrust on rod 72 from a new position of manual control lever 80, or a change occurs in the oil pressure in cylinder 50 from a movement of piston 67 in cylinder 42. Conversely, if the oil pressure in cylinder 50 (and the left end of cylinder 42) increases above that necessary to balance the thrust on rod 72, servo valve 51 will move to the left thus opening communication between cylinder 50 and drain pipe 49. This permits oil to escape back to tank 46 and lowers the pressure in cylinder 50 until it reaches a value equal to the thrust on rod 78 when servo valve will return to its neutral position and remain there until the balance of forces on servo valve 51 is again disturbed.

Similarly, the position of servo valve 29 is determined by the balance between the thrust on stem 28 and the oil pressure in the left end of cylinder 42 transmitted through piston 67 and spring 68. As long as these forces are in balance, servo valve 29 will remain in its neutral position, as shown in FIGURES 1 and 2. If, for any reason the jet thrust of engine 1 should increase, the thrust to the left on stem 28 will be correspondingly increased, overcoming the force of spring 68, and servo valve 29 will move to the left and uncover the entrance of conduit 48. This permits oil to escape from cylinder 55 of motor 56, through conduits 54 and 48, back to tank 45. This lowers the oil pressure in cylinder 55 and permits spring 64 to force piston 57 down which reduces the rate of delivery of fuel oil from pump 63 to the burners 4 in combustion chamber 3, and thereby reduces the jet thrust of the engine, until the correspondingly reduced thrust on stem 28 is less than the force of spring 68, whereupon servo valve 29 will again move to the right until it reaches its neutral position and equilibrium is restored. Conversely, if the oil pressure in the left end of cylinder 42 is increased by a movement of servo valve 51, responsive to a clock-wise movement of manual control lever 80, as described above, piston 67 moves to the right, increasing the compression of spring 68, which overcomes the thrust on stem 28, and servo valve 29 moves to the right. This movement uncovers conduit 43 and permits oil under higher pressure from pump 45 to flow through conduit 54 into cylinder 55 of motor 56, where it overcomes the force of spring 64 and moves piston 57 up, increasing the rate of fuel delivery of pump 63 to the burners 4 and thereby the jet thrust of the engine. The increased thrust of the engine correspondingly increases the thrust to the left on stem 28 until it overcomes the force of spring 68, whereupon servo valve 29 moves to the left until it reaches its neutral position and equilibrium is again established.

From the foregoing, it is clear that the engine 1 will at all times develop a jet thrust which is responsive to, and determined by, the position of the manual control lever 80, and with lever 80 in a selected position, any variation in the jet thrust of engine 1 will be automatically corrected by the action of servo valve 29 on fuel pump 63, so as to maintain the jet thrust of the engine at a constant value, as determined by the setting of manual control lever 80.

It is further apparent that action of servo valve 29 is at all times controlled by the action of servo valve 51 which determines the oil pressure in conduit 69 and since conduit 69 is connected through branch conduits 86 with all the other engines, servo valve 51 will equally control all the engines through their individual servo valve 29. Moreover, since the oil pressure in the left end of cylinder 42 on each engine is equalized by interconnecting oil conduit 69, the jet thrusts of all the engines will be equalized and responsive to the action of servo valve 51 which is controlled by the common manual control lever 80. Furthermore, since each individual engine is automatically controlled by its servo valve 29, any variation in thrust of one engine will be eliminated by the operation of its own servo valve 29 without affecting the operation of the other engines.

The above description of the operation of my control system has been based upon the arrangement shown in FIGURE 1. However, the operation of the arrangement shown in FIGURE 2 is substantially the same, when the manual control lever 80 of one of the engines has been selected as the control for the group of engines and the other manual control levers are rendered inoperative by locking the lower ends of levers 71 of the other engines by means of their cam latches 88 which are rotated 90° to the left so as to hold in fixed position the plates contacting the lower ends of said levers (see FIGURE 4).

The above description of the operation of my control system has been premised upon controlling the operation of each engine by varying its fuel supply. However, my control system is not limited to this particular method of control, but is equally applicable to controlling the operation of each engine by either varying its air supply or by varying the discharge of its exhaust gases.

If the air supply to the engine is the selected medium of control, the area $F_2$ of the exhaust gas outlet 7 is fixed (constant) and the mechanism for varying the cross-sectional area $F_1$ of the air inlet 2 is connected to link 61, and the arm 62 of fuel pump 63 is disconnected from links 61. The fuel pump 63 is then regulated by a fuel control mechanism responsive to the pressure $P_1$ at the air inlet 2. In this case, the pinion 26 operating the rack 23 is connected to the mechanism for varying the area $F_1$ of air inlet 2, instead of being connected to a manually operated means (control lever 80) for varying the area $F_1$.

Similarly, if the discharge of exhaust gases from the engine is the selected medium of control, the area $F_1$ of the air intake 2 is fixed (constant) and the mechanism for varying the cross-sectional area $F_2$ of the outlet 7 is connected to the link 61, and the arm 62 of fuel pump 63 is disconnected from link 61. The fuel pump 63 is then regulated by a fuel control mechanism responsive to the pressure $P_2$ at outlet 7 (see FIGURE 8). In this case also, the pinion 26 operating rack 23 is connected to the mechanism for varying the cross-sectional area $F_2$ of the exhaust gas outlet 7, instead of being connected to a manually operated means (control lever 80) for varying the area $F_2$.

While I have shown and described the preferred embodiment of my invention, I do not limit my invention to the constructional details disclosed by way of illustration, as these may be changed and modified by those skilled in the art without departing from the spirit of my invention nor exceeding the scope of the appended claims.

I claim:

1. In an aircraft propelled by a jet engine having an air inlet, and an exhaust gas outlet, a fuel supply apparatus for controlling the speed of flight by the jet thrust of the engine, comprising: manually movable control means for creating and maintaining a control force which varies in accordance with the movement of said control means; means for measuring the unit impact and static pressures at said inlet and outlet, first means, responsive to the differential between the said inlet unit impact and static pressures, for creating a first force proportional to said differential; second means, responsive to the differential between said outlet unit impact and static pressures, for creating and maintaining a second force proportional to said last mentioned differential; said first and second forces being proportional to the velocity pressures at said inlet and outlet, respectively; third means, responsive to the difference between said first and second forces, for creating and maintaining a regulating force which is proportional to said difference and is opposed to said control force; and fourth means, responsive to the resultant of said control and regulating forces, for regulating said jet thrust in accordance with said last-mentioned resultant force, whereby said jet thrust is varied in proportion to the movement of said control means, and said speed is controlled in accordance with the magnitude of said jet thrust.

2. Control apparatus according to claim 1, wherein said fourth means comprises means for varying said fuel supply in accordance with said last-mentioned resultant force.

3. Control apparatus according to claim 1, wherein said fourth means comprises means for varying the cross-sectional area of said air inlet in accordance with said last-mentioned resultant force.

4. Control apparatus according to claim 1, wherein said fourth means comprises means for varying the cross-sectional area of said exhaust gas outlet in accordance with said last-mentioned resultant force.

5. Control apparatus according to claim 1, wherein said fourth means comprises means for simultaneously and coordinately varying said fuel supply and the cross-sectional area of said air inlet, in accordance with said last-mentioned resultant force.

6. Control apparatus according to claim 1, having fifth means, for measuring the density of the exhaust gases at said exhaust gas outlet, and for modifying said regulating force in accordance with said density.

7. Control apparatus according to claim 6, wherein said fourth means comprises means for varying said fuel supply in accordance with said last-mentioned resultant force.

8. Control apparatus according to claim 6, wherein said fourth means comprises means for varying the cross-sectional area of said air inlet in accordance with said last-mentioned resultant force.

9. Control apparatus according to claim 6, wherein said fourth means comprises means for varying the cross-sectional area of said exhaust gas outlet in accordance with said last-mentioned resultant force.

10. Control apparatus according to claim 6, wherein said fourth means comprises means for simultaneously and coordinately varying said fuel supply and the cross-sectional area of said exhaust gas outlet, in accordance with said last-mentioned resultant force.

11. Control apparatus according to claim 6, having means for controlling the speed and temperature of said engine so that neither exceeds a selected safe value.

12. Control apparatus according to claim 7, having means for controlling the speed and temperature of said engine so that neither exceeds a selected safe value.

References Cited in the file of this patent

UNITED STATES PATENTS

| | | |
|---|---|---|
| 2,306,953 | Jung | Dec. 29, 1942 |
| 2,404,428 | Bradbury | July 23, 1945 |
| 2,457,595 | Orr | Dec. 28, 1948 |
| 2,466,908 | Perrill | Aug. 12, 1949 |
| 2,537,772 | Lundquist et al. | Jan. 9, 1951 |
| 2,540,594 | Price | Feb. 6, 1951 |
| 2,544,134 | Clark | Mar. 6, 1951 |
| 2,566,319 | Deacon | Sept. 4, 1951 |
| 2,580,962 | Sedille | Jan. 1, 1952 |
| 2,644,513 | Mock | July 7, 1953 |
| 2,853,851 | Chandler | Sept. 30, 1958 |

FOREIGN PATENTS

| | | |
|---|---|---|
| 50,033 | France | Aug. 1, 1939 |
| | (Addition to No. 779,655) | |
| 578,311 | Great Britain | June 24, 1946 |

OTHER REFERENCES

Aero Digest "Gas Turbine Propulsion Systems," by A. H. Redding, May 1947, pages 75–77 and 149.

Jet Propulsion and Gas Turbines by M. J. Zucrow; John Wiley and Sons, New York, 1948, pp. 514–516.

Gas Turbines For Aircraft by F. W. Godsey, Jr. and L. A. Young; McGraw-Hill, 1949; pp. 193–195, 233.